United States Patent [19]

Janssen et al.

[11] Patent Number: 4,580,049

[45] Date of Patent: Apr. 1, 1986

[54] PROBE FOR LOCATING MINERAL DEPOSITS

[75] Inventors: Klaus Janssen, Goslar; Helmut Winnacker, Ehlershausen; Klaus Johnen, Gehrden, all of Fed. Rep. of Germany

[73] Assignee: Preussag Aktiengesellschaft, Fed. Rep. of Germany

[21] Appl. No.: 598,848

[22] Filed: Apr. 10, 1984

[30] Foreign Application Priority Data

Apr. 11, 1983 [DE] Fed. Rep. of Germany ....... 3312884
Apr. 11, 1983 [DE] Fed. Rep. of Germany ....... 3312883

[51] Int. Cl.$^4$ .............................................. G01V 5/12
[52] U.S. Cl. .................................... 250/267; 250/269; 378/45
[58] Field of Search ............................ 378/45, 46–49; 250/269, 267, 264, 266

[56] References Cited

U.S. PATENT DOCUMENTS

| 2,909,661 | 10/1959 | Armistead | 250/267 |
| 3,015,030 | 12/1961 | Jones | 250/267 |
| 3,321,627 | 5/1967 | Tittle | 250/267 |
| 4,048,495 | 9/1977 | Ellis | 250/269 |
| 4,510,573 | 4/1985 | Boyce et al. | 378/48 |

FOREIGN PATENT DOCUMENTS

| 1044380 | 12/1978 | Canada | 378/45 |
| 718406 | 2/1942 | Fed. Rep. of Germany . | |
| 2831131 | 1/1979 | Fed. Rep. of Germany . | |
| 3312884 | 6/1984 | Fed. Rep. of Germany . | |
| 3312883 | 8/1984 | Fed. Rep. of Germany . | |
| 1387139 | 12/1964 | France . | |

*Primary Examiner*—Alfred E. Smith
*Assistant Examiner*—Carolyn E. Fields
*Attorney, Agent, or Firm*—Allegretti, Newitt, Witcoff & McAndrews, Ltd.

[57] ABSTRACT

A cylindrical probe for insertion into a drill hole for detecting the presence of mineral deposits. A source of radioactive irradiation and a detector are mounted concentrically within the housing of the probe, the detector being shielded from direct radiation by a wall having an upper conical surface which directs fluorescent radiation reflected from the wall of the drill hole to the detector. A disc-shaped slot concentrates the rays from the radioactive source on an area of the drill hole wall which is in the shape of a ring surrounding the probe. The concentration and close proximity of the radiation source and the detector permit precise scanning and analyzing, simply, cheaply and quickly.

6 Claims, 1 Drawing Figure

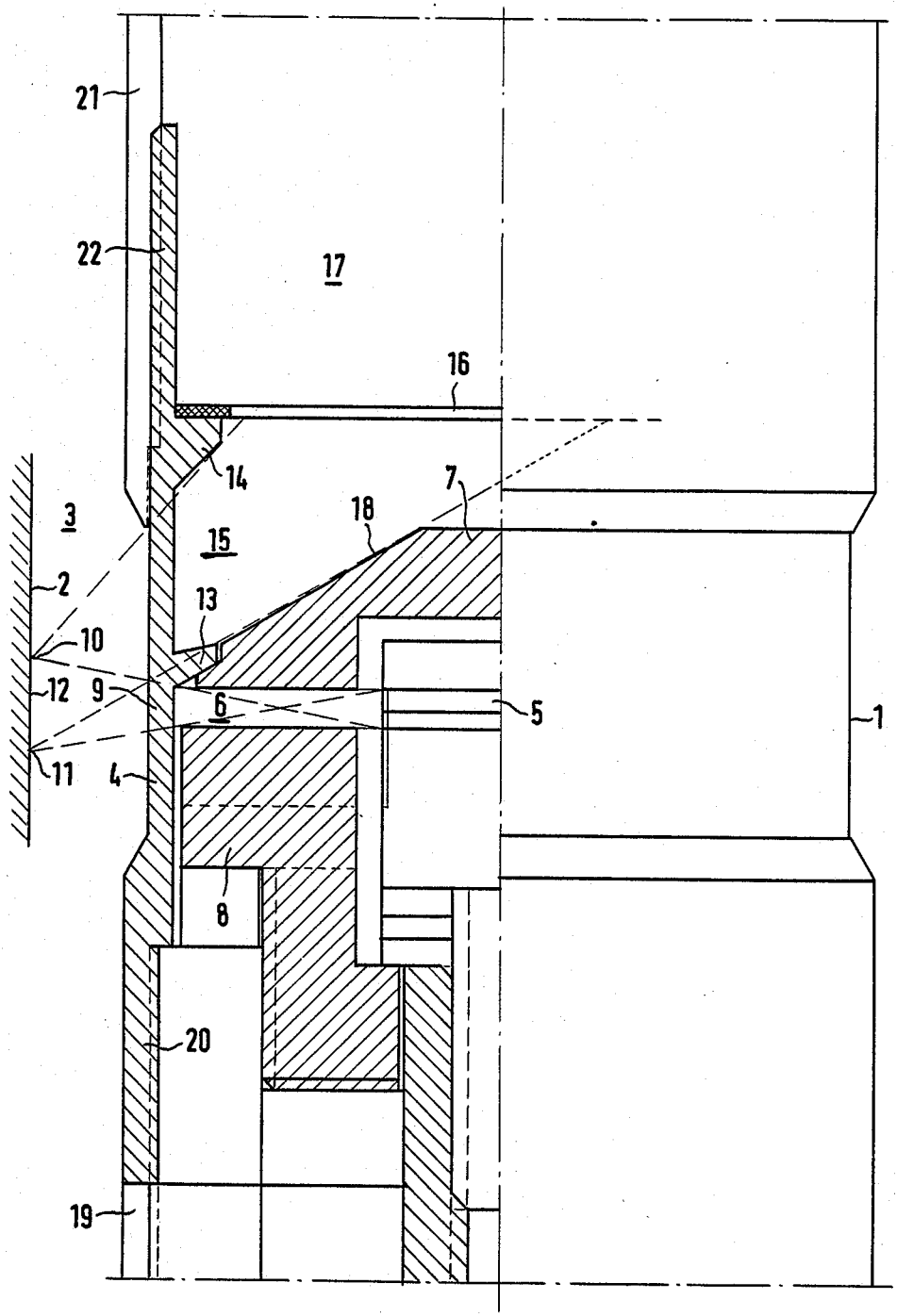

PROBE FOR LOCATING MINERAL DEPOSITS

The invention concerns a probe for insertion into a drill hole for detecting the presence of mineral deposits.

Prior Art

Probes of the type under discussion are known. They serve in locating mining deposits by using fluorescences which are stimulated by means of a radioactive source of irradiation located in the probe. The type and the character of the mineral deposit can be determined by evaluating the nature of the fluorescent radiation. It can particularly be determined whether heavy metal or ferrous metal ores are present in the deposit.

For the determination of the fluorescent radiation, it was known to position a semi-conductor crystal in the probe, which requires an extensive cooling assembly. Also, reflection of the radioactive irradiation extended in the known probes over a large area. Also, the reception of the fluorescent radiation occurred over an extensive area so that a fine analysis of the composition of the deposits was not possible.

Through U.S. Pat. No. 2,909,661, a probe of the type under discussion is known, in which the radiation-sensitive surface of a detector is located on an external circumference of an axial extension of the probe, and is therefore formed essentially as a cylindrical surface coaxial with the probe's axis. From there, the detector records radiation from a relatively large area surrounding the probe, and its distance from the source of radiation is necessarily relatively great. A slight decomposition results from both, which makes a fine investigation impossible.

The execution of core borings of slight diameter for the fine investigation of the vertical composition was known from this art. These are, however, time-consuming and costly. Moreover, core damage can occur so that the advantages are essentially lost.

Through French patent specification No. 1,387,139, a probe of the type under discussion is known, in which a protects the radiation detector against the arrival of radiation directly from the source of radioactive irradiation. However, the irradiation angles of the radioactive irradiation source to the wall of the bore, as well as the angle of incidence onto the detector, are so great that the vertical resolution is very slight. Thus, the information detected about the deposits is very limited.

THE INVENTION

The present invention provides a probe of the type under discussion, by means of which the composition of deposits, especially ore mineral deposits, can be precisely scanned and analysed simply, cheaply, accurately and quickly, out of smaller-caliber test drill holes and with a small penetration area of the irradiation for transmissions and reception.

In a preferred form of the invention, the probe has a disc-shaped annular slot surrounding the radiation source, which slot is adjustable in width. The slot confines the rays to a practically disc-shaped irradiation of the drill hole wall so that only a narrow ring is irradiated, and thus stimulated to fluoresence. Reflected fluorescent radiation is thereby collected by the receptor surface of the detector only from this narrow ring surface. Radiation from other areas does not impair the test results. There also occurs on the whole a greater clarity of detail which makes possible better findings about the mineral deposits. By concentrating the rays through the closely neighboring slot surfaces, increased energy is reflected from the wall of the drill hole.

The path of the reflected rays is directed to the detector through an annular conical aperture in the probe wall so that the detector is located closer axially to the reflecting surface. Thus, the intensity of the radiation collected is increased and, furthermore, secondary fluorescent irradiation reflected from directions other than the one wanted is curbed. Preferably the reception surface of the detector is circular, stands essentially vertical to the axis of the probe, and is turned to the radiation source. It can also can be slightly inclined or, for example, even conically shaped. By the arrangement of elements in accordance with the invention, the reception surface is spaced only a short distance from the radiation source.

The adjustable disc-shaped slot through the wall of the housing and disposed normal to the axis of the probe is, like the irradiation, narrow so that the material comprising the wall can be correspondingly small. The same applies to the area of the irradiation reflected from the fluorescene source onto the reception surface of the detector. The material above the slot shields the reception surface from direct radiation from the radiation source.

Especially suitable as a detector is a scintillation crystal or a semi-conductor, which do not require expensive cooling means such as is necessary in the semi-conductor crystals previously used.

The frusto-conical surfaces which define the aperture, when extended beyond the points of the cone, suitably intersect the reception surface, so that no portion of the fluorescing radiation impinges on the borehole wall which lies opposite the reflecting surface, which, undesirably, can stimulate further development.

DETAILED DESCRIPTION

In the drawing, the single FIGURE is a side view of a probe, the left half of which is in section.

A probe 1, in accordance with the invention, is disposed within a cylindrical wall 2 of a drill hole 3. The probe has a housing 4, in the internal space of which, coaxially to the housing, a radioactive source of radiation 5 is located. The rays of the source 5 pass through an annular disc-like slot 6 to the outside, which slot is formed between two annular apperture parts 7,8. The radiation, limited by the slot 6, enters into the drill hole 3 through a wall portion 9 of the housing 4, and irradiates an area of the wall 2 of the drill hole 3 which lies between two lines 10,11,and exhibits the form of a ring 12. The wall portion 9 is made from a material which does not dampen the radiation, such as beryllium. This area of the drill hole wall is stimulated for fluorescence, according to the ores present, and this fluorescence irradiation is reflected through an aperture 15 lying between two projections 13,14 inclined inwardly toward the reception surface 16 of a detector 17, which can be a scintillation detector or a semiconductor detector. The fluorescence signal is transformed into an intelligence signal electrically dependent upon it.

The aperture wall 7 has an external surface 18 directed toward the reception surface 16 of the detector 17, which surface is frusto-conical, and the extension of which, outside the probe, intersects approximately at line 11, that is, the approximate boundary of the irradiated ring 12 on the wall 2 of the drill hole 3. The wall axially deflects the fluorescent irradiation to the reception surface 16. Because of the conical form of the surface 18, the fluorescent irradiation from the area of the ring 12 can reach, substantially unimpaired, the entire reception surface 16 of the detector 17. The course of the radiation from the source of radiation 5 and from the fluorescent irradiation of the ring 12, is indicated by the thin dotted lines in the drawing.

The housing 4 is closed at the bottom by means of a plug 19 that is screwed into the internal screw thread 20. In the same way, the housing is closed at the top by means of a housing cap 21 which is screwed onto an external screw thread 22.

A coaxial cable extends out of the top of the probe 1 to a feeding device, by means of which the probe 1 can be moved into the drill hole 3 in a way that can be precisely determined. The current supply and transmissions of the intelligence signal from the detector 17 to a plotting circuit (not shown), which is located outside of the drill hole, is carried by means of the coaxial cable in a well-known manner.

We claim:

1. A probe for insertion into drill holes for locating mineral deposits, comprising, in combination,
   a cylindrical housing
   a radioactive radiation source within said housing
   a disk-shaped annular slot means surrounding said source lying in a plane perpendicular to the axis of the probe for concentrating rays from the source on a limited ring area of the drill hole wall when the probe is in the drill hole
   a radiation detector means for detecting fluorescent radiation resulting from stimulation by said rays, said detector means being spaced from said slot and having a reception surface turned toward the radiation source
   an annular aperture between said slot means and said detector means defined by a first wall lying on a frusto-conical surface coaxial with the probe and a second wall lying on a frusto-conical surface spaced from said first frusto-conical surface, said aperture gradually widening in the direction of said detector means said aperture being positioned such that fluorescent radiation stimulated by said rays and reflected from said limited ring area is directed to said reception surface.

2. The probe of claim 1 in which axial extensions of said frustoconical surfaces intersect the wall of said drill hole at the extremities of said limited ring area.

3. The probe of claim 2 in which said aperture lies immediately adjacent said slot means such that the axial distance between the detector means and the radiation source is minimized.

4. The probe of claim 1 in which said reception surface is perpendicular to the axis of said probe.

5. The probe of claim 1 in which the portion of the housing wall in the area of the extension of said slot means is made of beryllium.

6. The probe of claim 1 in which said detector means is a scintillation crystal or a semi-conductor detector.

* * * * *